(12) United States Patent
Fujiyoshi

(10) Patent No.: US 6,441,900 B1
(45) Date of Patent: Aug. 27, 2002

(54) METHOD AND APPARATUS FOR CALIBRATING AN OPTICAL SPECTRUM ANALYZER IN WAVELENGTH

(75) Inventor: Kenichi Fujiyoshi, Tokyo (JP)

(73) Assignee: Ando Electric Co., Ltd., Tokyo (JP)

( * ) Notice: Subject to any disclaimer, the term of this patent is extended or adjusted under 35 U.S.C. 154(b) by 0 days.

(21) Appl. No.: 09/537,010

(22) Filed: Mar. 28, 2000

(30) Foreign Application Priority Data

Mar. 30, 1999 (JP) ............................................. 11-090204

(51) Int. Cl.⁷ ............................... G01J 3/02; G01J 3/28
(52) U.S. Cl. ..................... 356/300; 356/326; 356/243.1
(58) Field of Search ................................ 356/300, 326, 356/328, 243.1

(56) References Cited

U.S. PATENT DOCUMENTS

| 4,779,216 A | 10/1988 | Collins |
| 5,557,404 A | 9/1996 | Matsui et al. ............... 356/319 |
| 6,249,343 B1 * | 6/2001 | Wang et al. ............. 356/243.1 |

FOREIGN PATENT DOCUMENTS

| EP | 0 381 053 | 8/1990 |
| EP | 0 692 703 A1 | 1/1996 |

OTHER PUBLICATIONS

Patent Abstracts of Japan, vol. 007, No. 127 (P–201), Jun. 3, 1983 & JP 58 045525, Mar. 16, 1983.

* cited by examiner

*Primary Examiner*—F. L. Evans
(74) *Attorney, Agent, or Firm*—Fish & Richardson P.C.

(57) ABSTRACT

Light having a predetermined wavelength band as issued from a light-emitting diode is launched into a gas absorption cell which is filled with a gas having a plurality of absorption spectra. The light launched into the cell has a plurality of wavelengths absorbed by the gas. The absorption wavelengths are known and their values are preset in a memory in an optical spectrum analyzing section 58. The light passing through the cell is launched into the optical spectrum analyzing section 58, where it receives arithmetic operations to produce an optical spectrum. The optical spectrum analyzing section 58 has a CPU which compares a plurality of wavelengths having dominant absorption in the obtained optical spectrum with the preset reference wavelengths to compute the errors in wavelength measurement. The calibration value is determined on the basis of the average of these errors and the optical spectrum analyzer is accordingly calibrated in wavelength.

4 Claims, 7 Drawing Sheets

METHOD AND APPARATUS FOR CALIBRATING AN OPTICAL SPECTRUM ANALYZER IN WAVELENGTH

BACKGROUND OF THE INVENTION

1. Field of the Invention

The present invention relates to an optical spectrum analyzer, in particular, to a method and an apparatus for calibrating an optical spectrum analyzer in wavelength while reducing calibration errors.

2. Description of the Related Art

The conventional method of calibrating an optical spectrum analyzer in wavelength starts with the emission from a light source of light having a predetermined wavelength band, which is then collimated with a lens. The resulting parallel light is admitted into a gas absorption cell which is filled with a gas having such characteristics that it absorbs only a specified wavelength component of light. Hence, the incident light has a specified wavelength component absorbed by the gas in the absorption cell. This absorption wavelength is known and only one wavelength is preliminarily set as a reference value in a memory section.

The light passing through the gas absorption cell is condensed with a lens and launched into an optical spectrum analyzing section, where the spectrum of the light is obtained.

The information about the spectrum obtained in the optical spectrum analyzing section is output to a CPU section for executing calibration. The CPU section detects the wavelength having the largest absorption in the spectrum; that is, only a single wavelength in the wavelength component absorbed by the gas absorption cell is detected by the CPU section. The detected single wavelength is compared with the known wavelength preset as a reference value in the memory section to calculate the difference in wavelength, or the error in measurement. On the basis of the calculated difference in wavelength, the CPU section determines a calibration value which, in turn, is based to calibrate the optical spectrum analyzer.

On account of its inherent characteristics, the results of measurement with the optical spectrum analyzer are inevitably subject to variations within a certain range, producing wavelength linearity (a maximum and a minimum error of measurement) of the shape shown in FIG. 4. Obviously, the maximum in the wavelength linearity of the optical spectrum analyzer is 0.04 nm. Suppose here that the analyzer is calibrated with reference to λA, the minimum error of measurement. The difference in wavelength at point D in FIG. 4 is corrected and, after calibration, the errors of measurement at the respective wavelengths are as shown in FIG. 5, producing a maximum error of 0.04 nm.

Thus, the conventional method of calibration which is referenced to only one wavelength has had a serious defect in that depending on the reference wavelength, there occurs an error of measurement as great as 0.04 nm.

The present invention has been accomplished under these circumstances and has as an object providing a method of calibrating an optical spectrum analyzer in wavelength that produces a smaller amount of errors in measurement than the conventional method.

SUMMARY OF THE INVENTION

Another object of the invention is to provide an apparatus that can implement the above-mentioned method of calibrating an optical spectrum analyzer in wavelength.

A first object of the invention is attained by a method for calibrating an optical spectrum analyzer in wavelength, in which the light from a light source emitting light in a predetermined wavelength band is passed through a gas absorption cell to have light absorbed at specified wavelengths and calibration in wavelength is performed on the basis of the result of optical spectrum measurement conducted after the absorption, said method further including the steps of detecting the difference between the result of measurement of each of the wavelengths having dominant absorption in the optical spectrum obtained by said measurement after the absorption and a preset reference value, calculating the average of the detected differences, and performing calibration in wavelength on the basis of said average.

A second object of the invention is attained by an apparatus for calibrating an optical spectrum analyzer in wavelength, which comprises a reference light source emitting light in a predetermined wavelength band, a gas absorption cell that absorbs light at specified wavelengths as particular portions of the light emitted from said reference light source, a wavelength difference detecting means for detecting the difference in wavelength between the result of measurement of each of the wavelengths having dominant absorption in the spectrum of the light passing through said gas absorption cell and a preset reference value, and a calculating means which calculates the average of the wavelength differences detected by said wavelength difference detecting means, calibration in wavelength being performed on the basis of the average calculated by said calculating means.

The apparatus of the second aspect may be modified according to a third aspect of the invention, wherein said light source is a light-emitting diode issuing light having a predetermined wavelength band.

The apparatus of the second or third aspects may be modified according to a fourth aspect of the invention, wherein said gas absorption cell is filled with a gas having a plurality of absorption spectra.

DETAILED DESCRIPTION OF THE PREFERRED EMBODIMENTS

On the pages that follow, we now describe in detail an embodiment of the present invention with reference to accompanying drawings.

Figure 1:
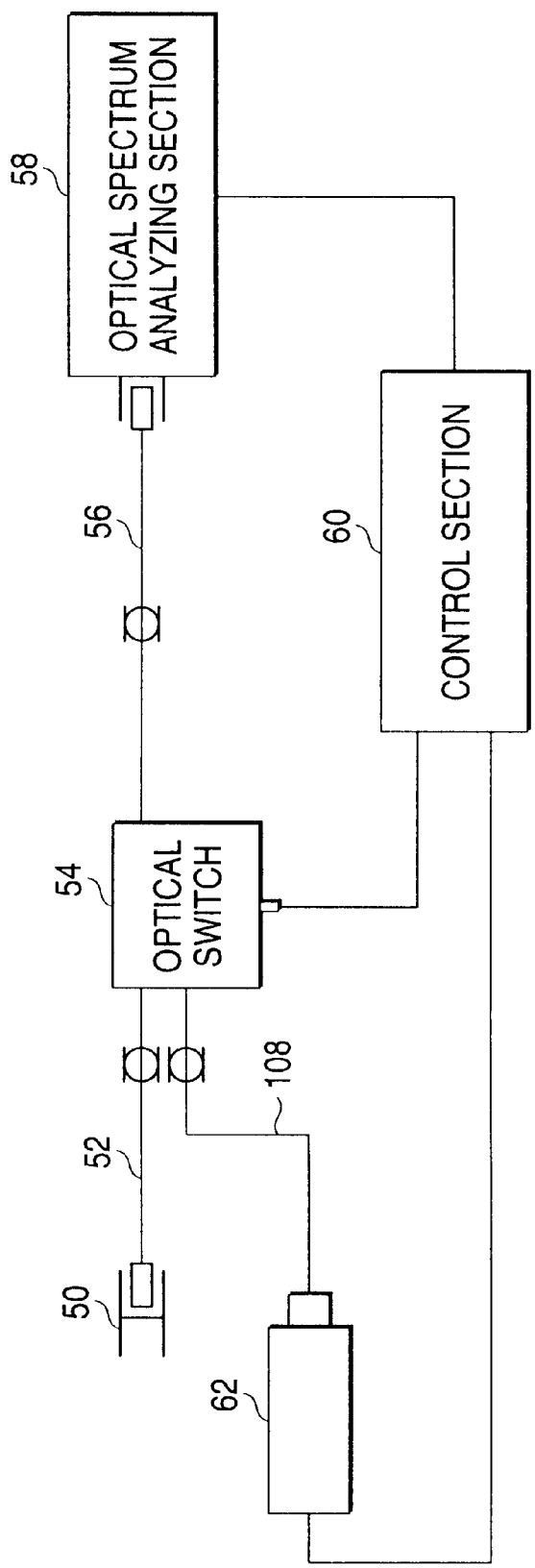
FIG. 1 is a block diagram showing the general construction of an optical spectrum analyzer using an apparatus for calibrating it in wavelength in accordance with an embodiment of the invention.

FIG. 1 is a block diagram showing the general construction of an optical spectrum analyzer. Indicated by 50 is an entrance end at which the light to be measured is launched; 52 is an optical fiber connected between the entrance end 50 and an optical switch 54. The optical switch 54 has two entrance ends and one exit end and it is controlled by a control section 60 such that either one of the two entrance ends is optically coupled to the exit end to ensure that the light launched at either one of the two entrance ends emerges from the exit end.

The exit end of the optical switch 54 is connected to one end of an optical fiber 56. The other end of the optical fiber 56 is connected to an entrance end of an optical spectrum analyzing section 58.

Figure 2:
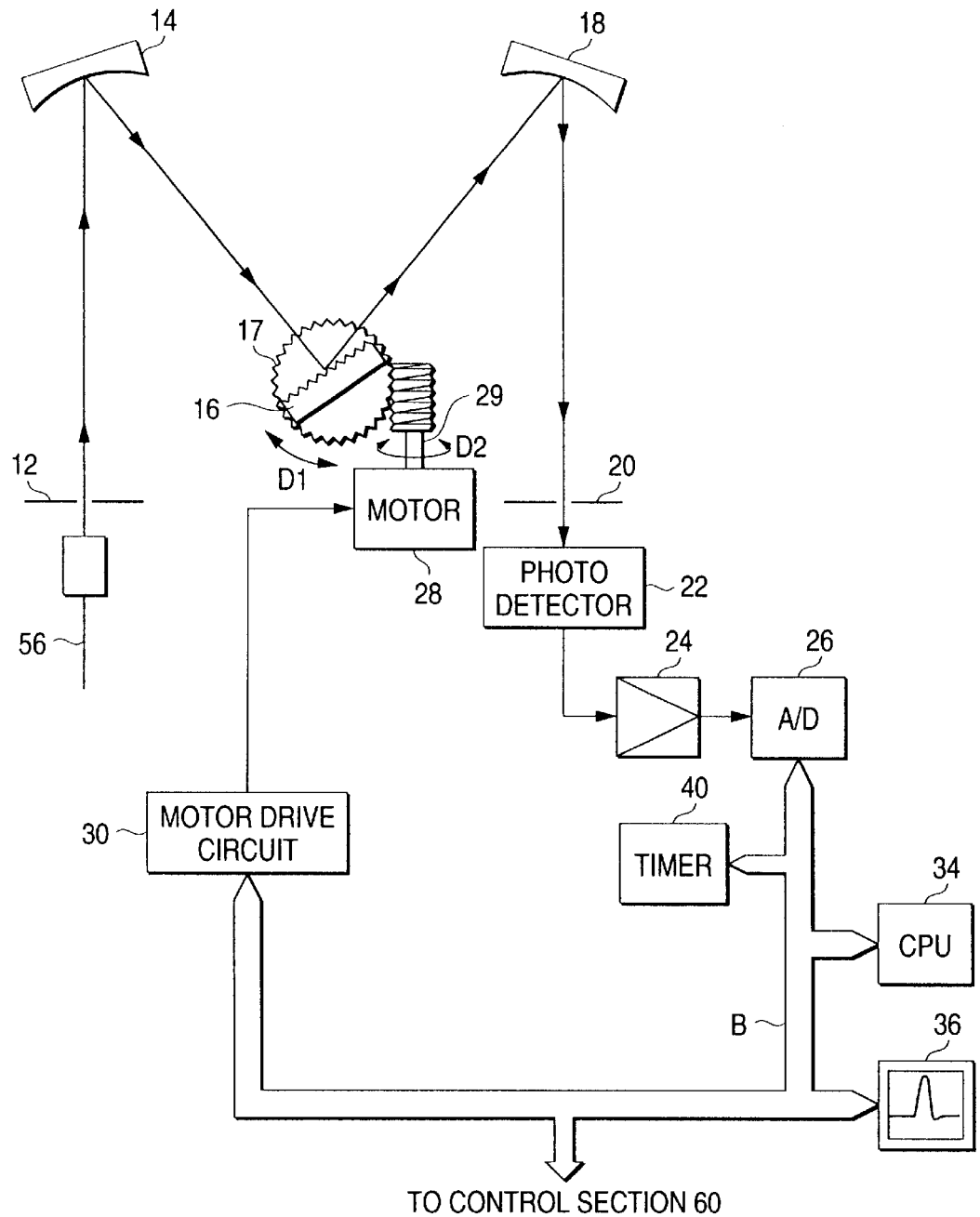
FIG. 2 is a block diagram showing the construction of the optical spectrum analyzing section 58 in the same optical spectrum analyzer.

FIG. 2 is a block diagram showing the construction of the optical spectrum analyzing section 58. Indicated by 12 is an entrance slit, 14 is a concave mirror, and 16 is a diffraction grating. The entrance slit 12 limits the wavelength band of the incident light. The concave mirror 14 collimates the light passing through the entrance slit 12. The diffraction grating 16 has a multiple of grooves formed in the surface so that the parallel light from the concave mirror 14 is spatially resolved on a wavelength basis.

The diffraction grating 16 is mounted on a stage 17 capable of rotation in either of the two directions indicated by D1 so that it rotates in synchronism with the stage 17 in the same direction in which the latter rotates. Indicated by 18 is a concave mirror and only that portion of the light that is incident on the concave mirror 18 after being spatially resolved by the diffraction grating 16 on a wavelength basis is focused by that mirror to be imaged in the same position as an exit slit 20. The exit slit 20 limits the wavelength band of the light thus imaged by the concave mirror 18.

The entrance slit 12, concave mirror 14, diffraction grating 16, concave mirror 18 and exit slit 20 combine to make a Zerni-Turner dispersive spectroscope.

Indicated by 22 is a photodetector such as a photodiode, by which the intensity of light emerging from the exit slit 20 is converted to an electrical signal; 24 is an amplifier for amplifying the electrical signal that is output from the photodetector 22; and 26 is an analog/digital converter (hereunder referred to as an "A/D converter") by which the value amplified with the amplifier 24 is converted to a digital signal.

Indicated by 28 is a motor for rotating the stage 17 on which the diffraction grating 16 is mounted, and 29 is the rotating shaft of the motor 28. As the rotating shaft 29 of the motor 28 rotates in either of the directions indicated by D2, the stage 17 and the diffraction grating 16 rotate in either of the directions indicated by D1. Indicated by 30 is a motor drive circuit which controls the rotational movement of the rotating shaft 29 of the motor 28 in response to a control signal from a CPU 34 (to be described later).

Indicated by 36 is a display device such as a CRT (cathode-ray tube) or a liquid crystal; 40 is a timer for recording date and time.

CPU 34 is connected to the A/D converter 26, motor drive circuit 30, display device 36, timer 40 and a control section 60 (to be described later) via bus B. CPU 34 not only outputs a control signal for controlling the motor drive circuit 30; it also performs arithmetic operations on the digital signal being output from the A/D converter 26 and causes the display device 36 to represent a certain result, say, a spectrum distribution.

Another function of the CPU 34 is to execute a program for calibrating the optical spectrum analyzer a specified time after the power of the optical spectrum analyzing section has been turned on or at the time intervals desired by the operator (e.g. every one hour or every day), whichever is determined by the date/time signal being output from the timer 40.

Turning back to FIG. 1, the control section 60 switches between the two entrance ends of the optical switch 54 in response to a control signal being output from the optical spectrum analyzing section 58. In response to this control signal, the control section 60 also outputs an operational signal that controls the operation of a reference light source 62.

Figure 3:
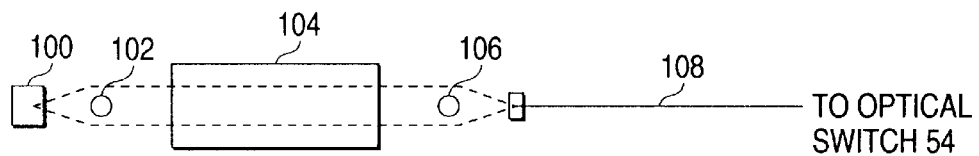
FIG. 3 is a block diagram showing the construction of the reference light source 62 in the same optical spectrum analyzer.
Figure 4:
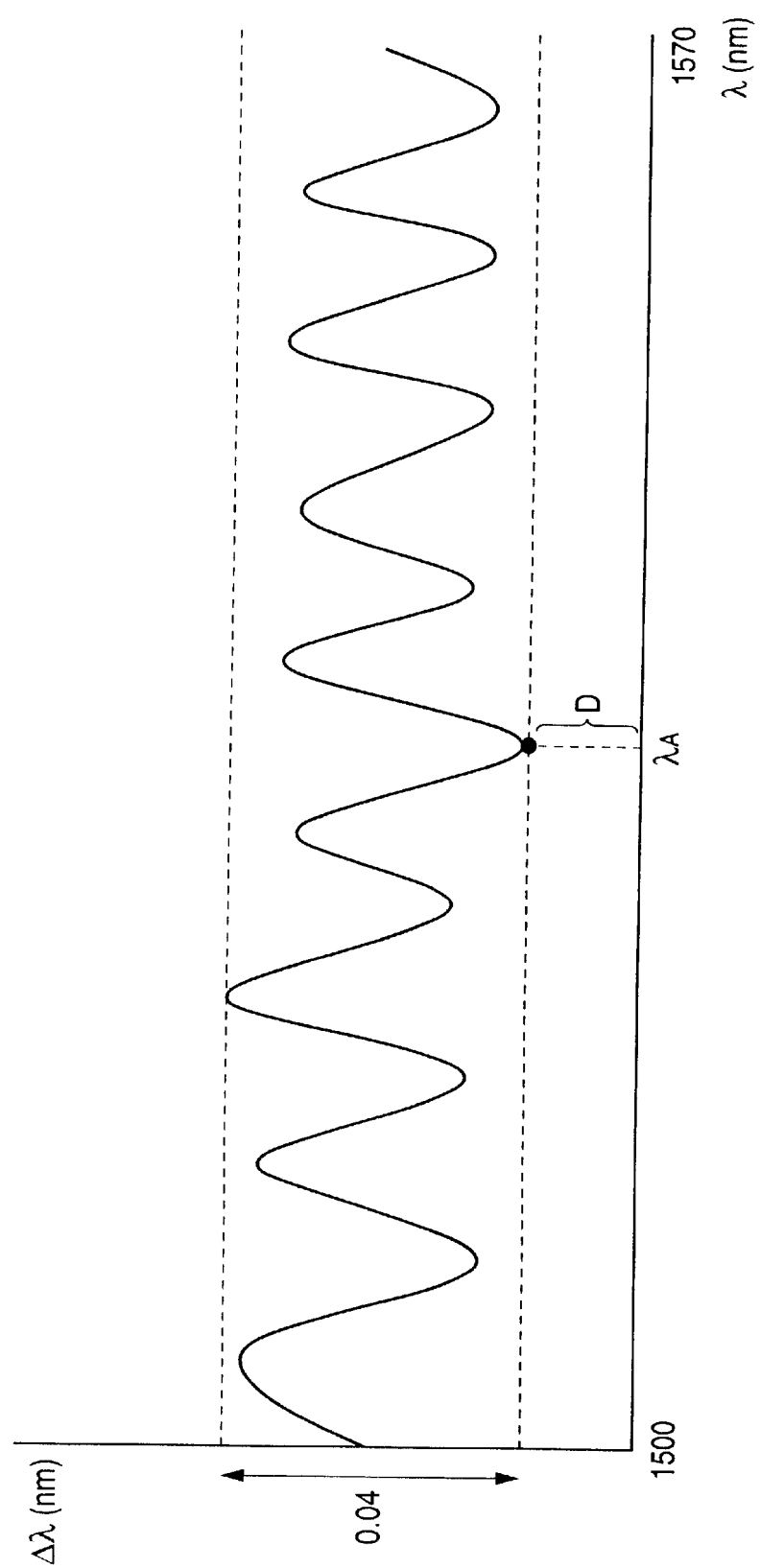
FIG. 4 is a graph showing the errors in wavelength measurement by the conventional optical spectrum analyzing section.
Figure 5:
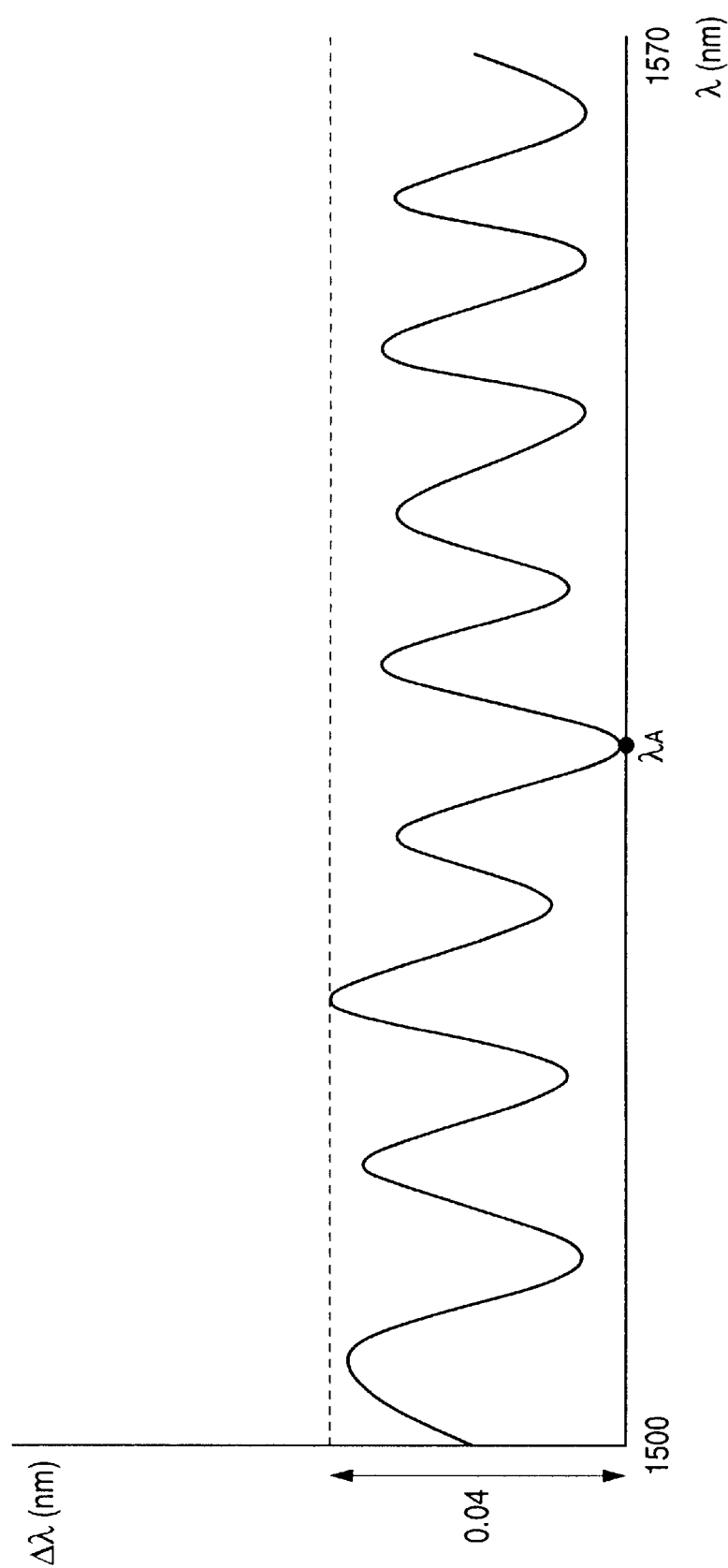
FIG. 5 is a graph showing the errors in wavelength measurement by the optical spectrum analyzing section after it is calibrated by the conventional method.

The reference light source 62 typically has the construction shown in FIG. 3. Indicated by 100 is a light-emitting diode; 102 is a lens for collimating the light issued from the light-emitting diode 100; 104 is a gas absorption cell typically filled with acetylene gas which absorbs light of characteristic wavelengths. The gas absorption cell 104 is extremely stable in the face of environmental changes, say, changes in temperature; hence, the center of the frequency band absorbed by the cell is substantially constant despite the changes in the ambient temperature. Indicated by 106 is a lens for focusing the light passing through the gas absorption cell 104. The focal point of the lens 106 is set to coincide with an end of an optical fiber 108, which is connected to the other entrance end of the optical switch 54.

This is how the optical spectrum analyzer having the above-described construction is calibrated in wavelength. The following description assumes that calibration is executed within a specified time after the power of the optical spectrum analyzing section 58 is turned on.

When the power of the optical spectrum analyzing section 58 is turned on, the CPU 34 in that section starts to execute the calibration program a specified time later on the basis of the date/time signal being output from the timer 40. The CPU 34 first outputs a control signal to the control section 60, which then outputs an operational signal to the reference light source 62. In response to the operational signal, the light-emitting diode 100 in the reference light source 62 issues light.

The issued light has a predetermined wavelength band. It is collimated by the lens 102 and launched into the gas absorption cell 104, where it is absorbed at a plurality of wavelengths (e.g. $\lambda 1$ and $\lambda 2$ in FIG. 6) by the gas (e.g. acetylene gas) in the cell 104. Note that the absorption wavelengths are preset as reference wavelengths in a memory (not shown) in the optical spectrum analyzing section 58.

The light passing through the gas absorption cell 104 is condensed by the lens 106 and launched into the optical fiber 108 via the exit end of the reference light source 62. The incident light travels through the optical fiber 108 until it enters the optical switch 54, whereupon the control section 60 outputs a control signal to the optical switch 54 so that the entrance end connected to the optical fiber 108 is optically coupled to the exit end.

As a result of this process, the light issuing from the reference light source 62 is guided into the entrance slit 12 in the optical spectrum analyzing section 58. The light passing through the entrance slit 12 is collimated by the concave mirror 14 and incident on the diffraction grating 16. The motor 28 drives the grating 16 to rotate unidirectionally about the shaft extending parallel to the multiple of grooves in the surface of the grating 16. Since the angle the grating 16 forms with the parallel (collimated) light varies consecutively, only the light of the wavelength that is determined by such factors as the angle the parallel light forms with the grating 16 is consecutively projected toward the concave mirror 18. The light incident on the concave mirror 18 is focused to be imaged in the same position as the exit slit 20. The light passing through the exit slit 20 has only the wavelength component that is within the width of the exit slit 20.

The light passing through the exit slit 20 is received by the photodetector 22 which converts it to an electrical signal proportional to its intensity. The output of the photodetector 22 enters the amplifier 24 where it is amplified to a voltage sufficient for reception by the A/D converter 26. The digital signal being output from the A/D converter 26 is supplied to the CPU 34, where it receives arithmetic operations to produce an optical spectrum.

Figure 6:
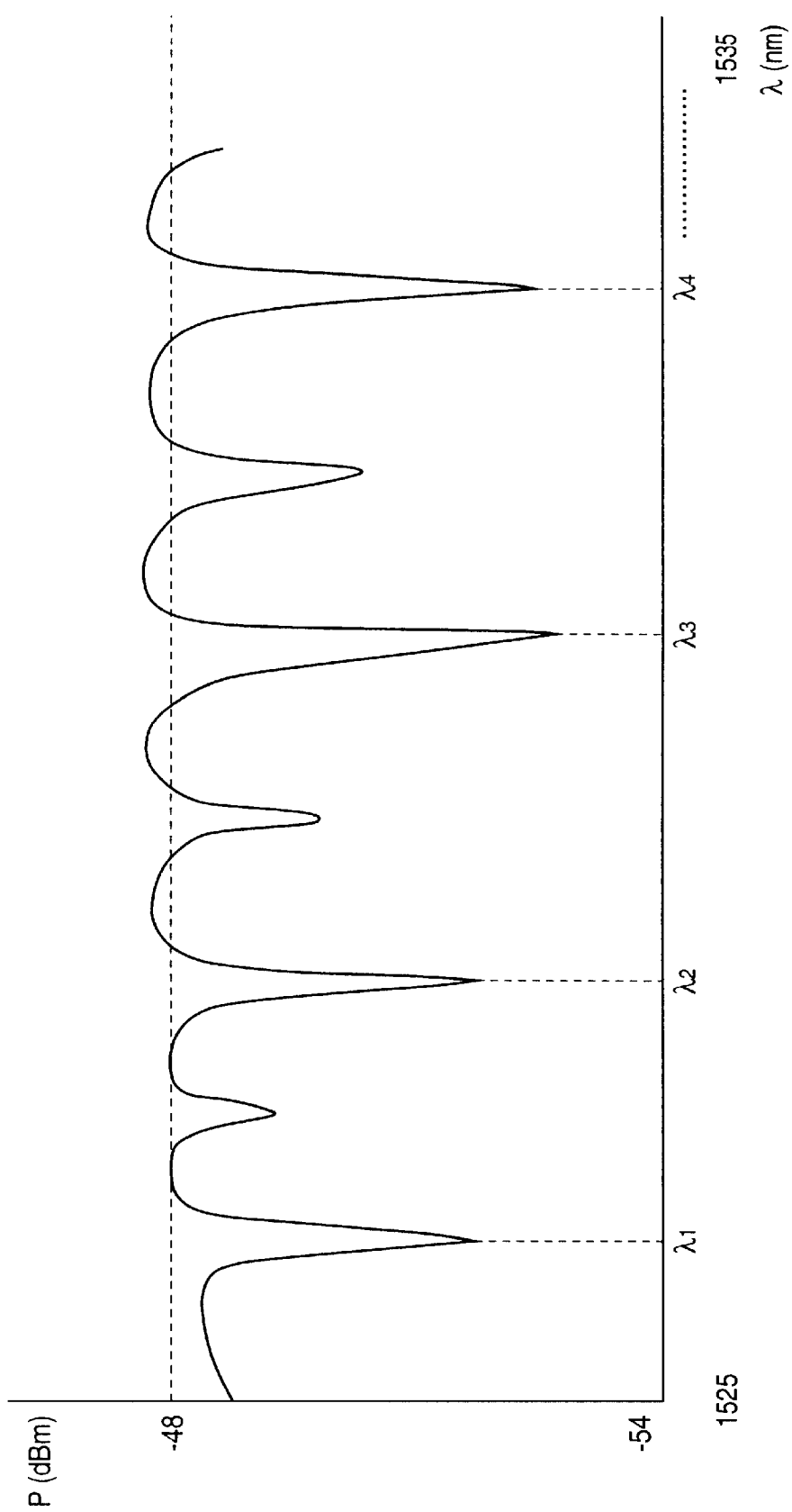
FIG. 6 is a graph showing an optical spectrum containing a plurality of wavelengths having dominant absorption.
Figure 7:
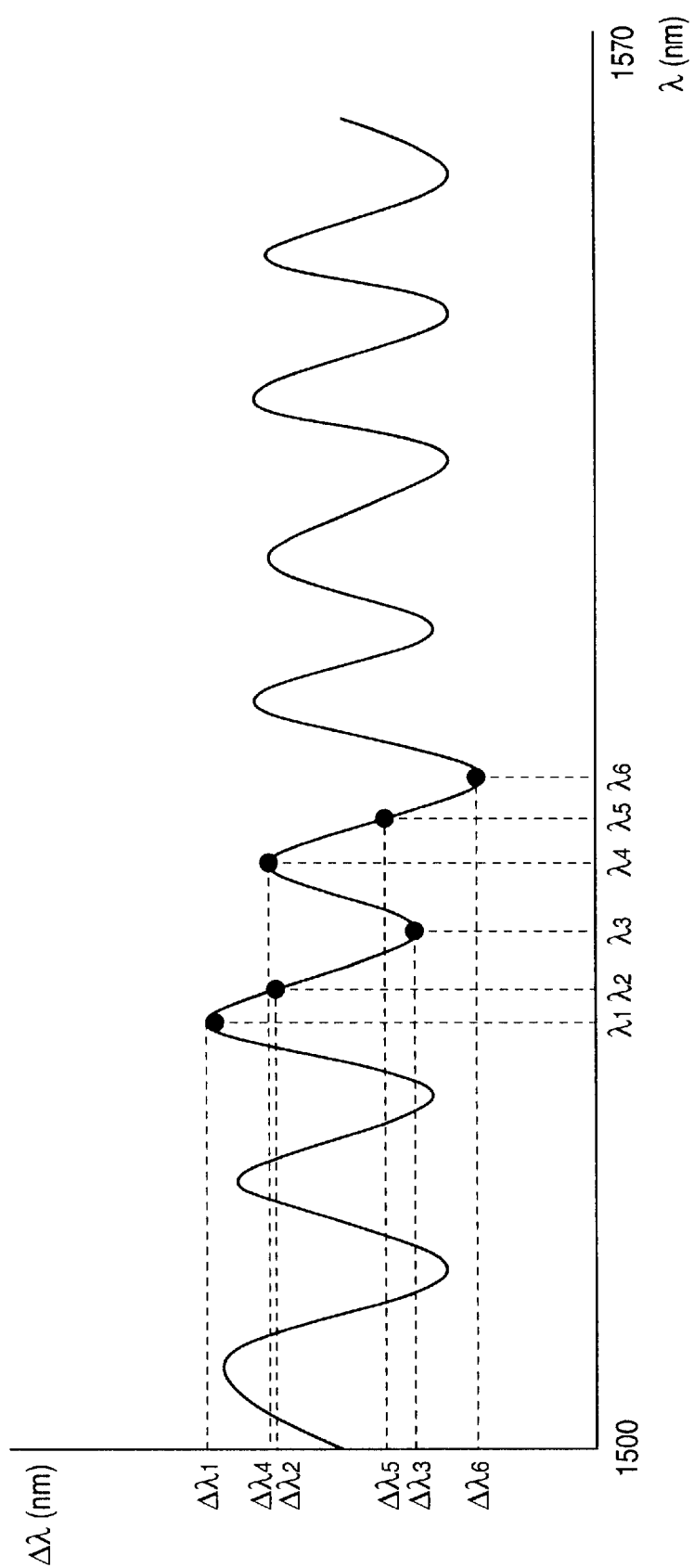
FIG. 7 is a graph showing the errors in measurement by the optical spectrum analyzing section 58 at a plurality of reference wavelengths.

CPU 34 measures the wavelengths having dominant absorption in the obtained optical spectrum, as exemplified by $\lambda 1$ and $\lambda 2$ in FIG. 6. The CPU then compares the result of measurement with the plurality of reference wavelengths preset in the memory section. FIG. 7 shows several of the errors (differences in wavelength) obtained by the comparison (i.e., $\Delta\lambda 1$–$\Delta\lambda 6$).

CPU 34 determines $\Delta\lambda ave$, or the average of these errors, by the following equation (1):

$$\Delta\lambda ave=(\Delta\lambda 1+\Delta\lambda 2+\ldots+\Delta\lambda n)/n \qquad (1)$$

The CPU then converts the average to the number of pulses necessary for shifting the angular setting of the diffraction grating 16. This conversion is needed to ensure that the wavelengths of dominant absorption as measured by the optical spectrum analyzing section 58 are brought into agreement with the reference wavelengths preset in the memory section. The CPU 34 supplies the motor drive circuit 30 with a control signal indicating the calculated number of pulses.

On the basis of this control signal, the motor drive circuit 30 drives the motor 28 and varies the angular setting of the diffraction grating 16.

When the above-described calibration process ends, CPU 34 sends a control signal to the control section 60 so that it controls the optical switch 54 to couple the exit end to the entrance end connected to the optical fiber 52. The CPU 34 also sends an END signal to the reference light source 62 to stop its operation.

Figure 8:
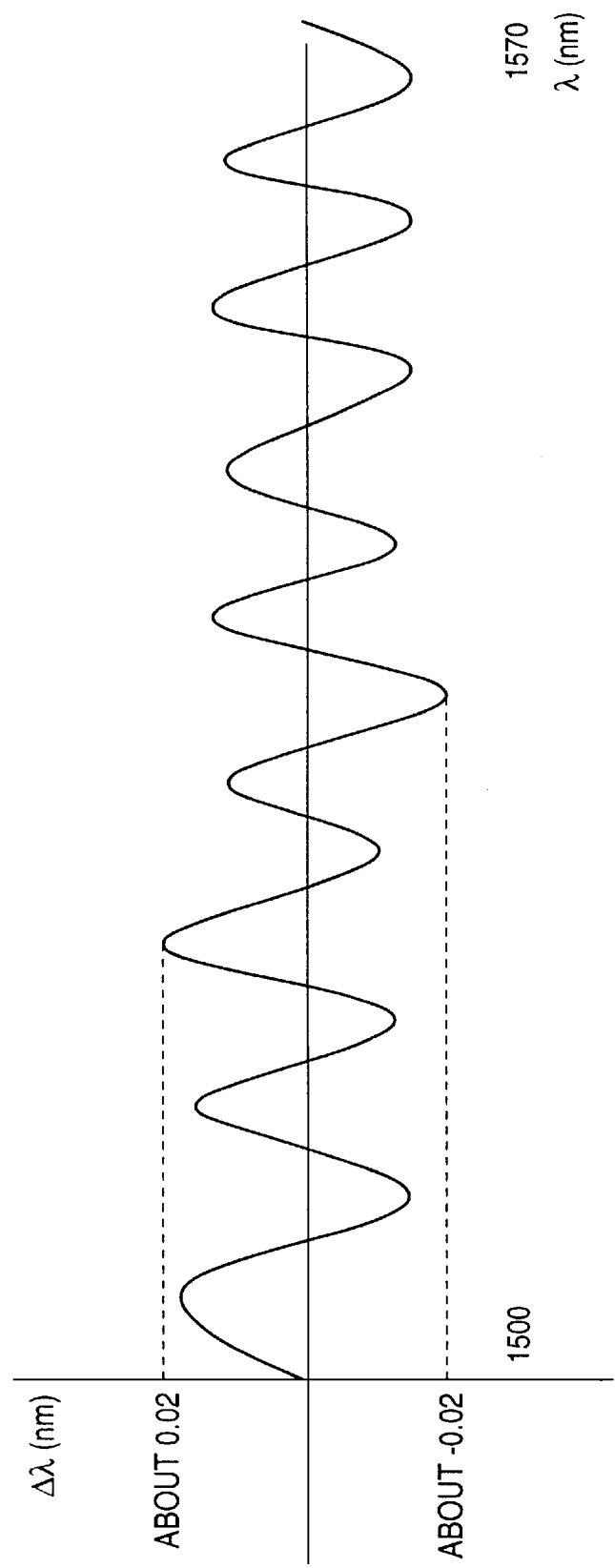
FIG. 8 is a graph showing the errors in measurement by the optical spectrum analyzing section 58 after it is calibrated by the apparatus mentioned in connection with FIG. 1.

As described on the foregoing pages, according to the present invention, light of which a plurality of predetermined wavelength components have been absorbed is analyzed in the optical spectrum analyzing section 58 and the optical spectrum analyzer is calibrated in wavelength with reference to a plurality of wavelengths having dominant absorption in the obtained optical spectrum. Using this method, the maximum error in wavelength measurement with the optical spectrum analyzer that has been 0.04 nm in the prior art can be reduced to about 0.02 nm (see FIG. 8), thus contributing to greater accuracy in measurement.

What is claimed is:

1. A method for calibrating an optical spectrum analyzer in wavelength, said method comprising the steps of:

passing a light from a light source emitting light in a predetermined wavelength band through a gas absorption cell to absorb light at specified wavelengths;

determining wavelengths having dominant absorption;

detecting the difference between a resulting measurement of each of the wavelengths having dominant absorption and a corresponding preset reference value;

calculating the average of the detected differences; and performing calibration in wavelength on the basis of said average.

2. An apparatus for calibrating an optical spectrum analyzer in wavelength, comprising:

a reference light source emitting light in a predetermined wavelength band;

a gas absorption cell that absorbs light at specified wavelengths as particular portions of the light emitted from said reference light source;

a wavelength difference detecting means for detecting the difference in wavelength between the result of measurement of each of the wavelengths having dominant absorption in the spectrum of the light passing through said gas absorption cell and a preset reference value; and a calculating means which calculates the average of the wavelength differences detected by said wavelength difference detecting means, calibration in wavelength being performed on the basis of the average calculated by said calculating means.

3. The apparatus according to claim 2, wherein said light source is a light-emitting diode issuing light having a predetermined wavelength band.

4. The apparatus according to claim 2, wherein said gas absorption cell is filled with a gas having a plurality of absorption spectra.

* * * * *